No. 859,837. PATENTED JULY 9, 1907.
A. F. PHILIPPI.
EMBOSSING MACHINE.
APPLICATION FILED FEB. 19, 1906.

ATTEST.

INVENTOR
ALEXANDER F. PHILIPPI.
BY
ATT'YS.

No. 859,837. PATENTED JULY 9, 1907.
A. F. PHILIPPI.
EMBOSSING MACHINE.
APPLICATION FILED FEB. 19, 1906.

ATTEST.

INVENTOR
ALEXANDER F. PHILIPPI.
ATTY'S.

No. 859,837. PATENTED JULY 9, 1907.
A. F. PHILIPPI.
EMBOSSING MACHINE.
APPLICATION FILED FEB. 19, 1906.

ATTEST.
H. J. Fletcher.
W. P. Smith

INVENTOR.
ALEXANDER F. PHILIPPI.
BY Higdon & Longan
ATTY'S.

No. 859,837. PATENTED JULY 9, 1907.
A. F. PHILIPPI.
EMBOSSING MACHINE.
APPLICATION FILED FEB. 19, 1906.

ATTEST.
H. J. Fletcher.
M. P. Smith.

INVENTOR.
ALEXANDER F. PHILIPPI.
BY Higdon & Longan
ATT'Y'S

No. 859,837.

PATENTED JULY 9, 1907.

A. F. PHILIPPI.
EMBOSSING MACHINE.
APPLICATION FILED FEB. 19, 1906.

ATTEST.
H. J. Fletcher.
M. P. Smith.

INVENTOR.
ALEXANDER F. PHILIPPI.
BY Higdon & Longan
ATTY'S.

No. 859,837. PATENTED JULY 9, 1907.
A. F. PHILIPPI.
EMBOSSING MACHINE.
APPLICATION FILED FEB. 19, 1906.

ATTEST.
Id. J. Fletcher
M. P. Smith

INVENTOR.
ALEXANDER F. PHILIPPI.
By Higdon & Longan
ATTY'S.

THE NORRIS PETERS CO., WASHINGTON, D. C.

No. 859,837. PATENTED JULY 9, 1907.
A. F. PHILIPPI.
EMBOSSING MACHINE.
APPLICATION FILED FEB. 19, 1906.

ATTEST.
H. J. Fletcher
W. P. Smith

INVENTOR.
ALEXANDER F. PHILIPPI.
BY Higdon & Longan
ATT'Y'S

No. 859,837. PATENTED JULY 9, 1907.
A. F. PHILIPPI.
EMBOSSING MACHINE.
APPLICATION FILED FEB. 19, 1906.

ATTEST.
H. J. Fletcher
M. P. Smith

INVENTOR
ALEXANDER F. PHILIPPI.
BY Higdon & Longan
ATTY'S.

No. 859,837. PATENTED JULY 9, 1907.
A. F. PHILIPPI.
EMBOSSING MACHINE.
APPLICATION FILED FEB. 19, 1906.

INVENTOR.
ALEXANDER F. PHILIPPI.

UNITED STATES PATENT OFFICE.

ALEXANDER F. PHILIPPI, OF ST. LOUIS, MISSOURI.

EMBOSSING-MACHINE.

No. 859,837.  Specification of Letters Patent.  Patented July 9, 1907.

Application filed February 19, 1906. Serial No. 301,911.

*To all whom it may concern:*

Be it known that I, ALEXANDER F. PHILIPPI, a citizen of the United States, and a resident of St. Louis, Missouri, have invented certain new and useful Improvements in Embossing-Machines, of which the following is a specification containing a full, clear, and exact description, reference being had to the accompanying drawings, forming a part hereof.

My invention relates to an embossing press, of the type used for simultaneously embossing and printing material used for bill and letter heads, envelops, cards, and similar stationery.

My improved machine consists of certain novel features and details of construction of which the following are the fundamental parts and essential features, namely: A minimum area of floor space to be occupied by the entire machine in combination with strength and increased efficiency and speed in operation; the providing of simple mechanism whereby a quick and positive action is imparted to the plunger carrying the impression or counter die, and which mechanism also provides for the quick release and return of said plunger: a simple means whereby high pressure is applied to the plunger at the time the printing and embossing operation is effected: a throw off mechanism for releasing the impression of the plunger to the die at will, so as to provide for the continuous inking of the die whenever desired: means for locking the reciprocating bed positively in position at the time the plunger descends: means for easily and quickly adjusting the impression die relative the plunger: means whereby the die is positively locked to the reciprocating bed: a rocking die wiping mechanism arranged so as to expose a continuous clean surface to the surface of the printing die, together with means for adjusting said wiping mechanism: a reciprocating ink roller frame, and means whereby the inking roller is rotated so as to present a different surface to the die as it passes thereover the second time: adjustable means for accurately regulating the feed of the continuous wiping strip.

My invention further consists in certain novel features of construction and arrangement of parts, that will be hereinafter more fully described, claimed, and illustrated in the accompanying drawings, in which:—

The general operation of my improved press is as follows: After an impression has been made, or a sheet has been printed and embossed, the printing die carried in its bed moves from the front of the machine rearwardly, which movement takes place immediately after the counter die is elevated. Simultaneous with the rearward movement of the printing die and carrier, the inking roller moves forwardly through the machine, and passes over the surface of said die. When the die carrying bed reaches its rearward limit of movement, and the inking roller reaches its forward limit of movement, the motions are reversed, the die and carrier moving toward the front, and the inking roller toward the rear of the press. This action necessarily results in a second inking of the die, and immediately thereafter the surface of the die is engaged by the rocking wiper, which removes the excess ink therefrom. The die continues in its forward movement toward the front of the machine until it is in its proper position, a fresh sheet is laid thereon, the plunger carrying the counter die moves downwardly, and by means of the compound toggle mechanism, pressure is applied to the counter die to print and emboss the inserted sheet.

The frame of my improved press comprises the right hand side frame 1, the left hand side frame 2, which are united at their front ends by the transversely arranged front frame 3. The rear ends of the side frames 1 and 2 are provided with integral arms 4, which extend upwardly and rearwardly a short distance. The body of the frame so constructed is supported on suitable standards 5, and extending upwardly from the ends of the front frame 3 are heavy rods 6, which support the upper cross piece 7. Fixed in the under side of this cross piece 7 is a transversely arranged bar 8. in the under side of which is formed a groove 9, which is in direct vertical alinement with the center of the front frame 3. Seated in the upper ends of the extensions 4 are the lower rear ends of rods 10, which occupy inclined positions immediately over the side frames 1 and 2, and the upper ends of said rods are seated in the ends of the cross piece 7. Formed on the inside faces of the frames 1 and 2 and in approximate horizontal alinement with the top edge of the front frame 3 are shoulders 11, on which are fixed longitudinally extending bars 12, L-shape in cross section, and which form tracks on which the printing die carrier reciprocates. Bolted to the outside face of the frame 1 is a bracket 13, in which is journaled the outer end of the main driving shaft 14 of the press, the inner end of which shaft is journaled in the side wall 1. Rigidly fixed upon the shaft 14 between the bracket 13 and the side frame 1 are the pinions 16 and 17, the latter being slightly smaller than the pinion 16. Rigidly fixed on the outer end of the shaft 14, outside the bracket 13 is a large pulley 14ª, which receives the belt which drives the entire press. Extending transversely through the body of the press and journaled in the side walls of frames 1 and 2 thereof and to the rear of the driving shaft 14 is a counter-shaft 18, on the right hand end of which is fixed a gear wheel 19, that meshes with and is driven by the pinion 17. Bolted to the inside face of the center of this gear wheel 19 is a plate 20, the greater portion of the edge of which is formed on a circle concentric with the center of the shaft 18, and the remaining portion of its edge being straight, as indicated by 21. A plate 22 in the form of a ring is secured to the inside face of the gear wheel 19, around the plate 20, and the opening in said ring is of the same shape as is the periphery of the plate 20, but slightly larger, and thus a continuous cam groove, or slot, is formed between said ring and plate, which groove or slot is for the greater portion of its length circular and concentric with the center of the shaft 18, as indicated by 23, and the remaining portion of its length being straight, as indicated by 24. Pivotally mounted on the outer face of the right hand side frame 1, and at the rear end thereof, is a segment 25, the front end of which is provided with a series of teeth 26. Journaled in the side frame 1, just in front of the front edge of this segment is a short shaft 27, on the outer end of which is fixed a pinion 28 that meshes with the teeth 26 on the segment. Fixed on the inner end of this shaft 27, and on the inside of the side frame 1 is a gear wheel 29. Journaled on the outer face of the segment 25, at a point near the top thereof, is a roller 30, which operates in the cam groove, or slot, between the plate 20 and the ring 22. Formed in the segment 25 and extending upwardly therein from the bottom edge is a curved slot 31, which is concentric with the pivot point of the segment, and is for the purpose of accommodating the counter-shaft 18 when the segment moves upwardly and downwardly.

Referring now to Figs. 22 to 26, inclusive, the construction of the die and die carrier which reciprocate upon the L-shape tracks 12 will be described: The base of the die carrier comprises a rectangular block 32, with the sides of which are formed integral longitudinally extending arms 33, and formed on the top sides of these arms 33 are the longitudinally extending inclined shoulders 34. Extending longitudinally through the block 32 is an aperture 35, and extending outwardly from the side faces of the arms 33 are ribs 36, which ride directly upon the L-shape tracks 12. Rigidly fixed to the under side of the left hand one of the arms 33 is a rack bar 37, the teeth of which mesh with the gear wheel 29. Arranged on top of the arms 33, and to the front and rear of the block 32 are the die clamping plates 38, the ends of which are provided with the downwardly extending dovetail ribs 39, which engage against the inclined shoulders 34 on the arms 33. Clamping screws 40 pass through suitably formed apertures in the ends of one of these clamping plates, and enter screw threaded apertures in the ends of the opposite plate. A draw bolt 41, provided on one end with a right hand thread, and on its opposite end with a left hand thread, passes through the aperture 35 in the block 32, and engages through corresponding screw threaded apertures in the centers of the clamping plates 38. The top surfaces of the clamping plates 38 are inclined slightly from their outer edges toward their inner edges, as indicated by 42, and the die plate 43, which normally lies upon the block 32, between the clamping plates 38, is slightly higher than the inner edges of said clamping plates. The manipulation of the draw bolt 41 causes the clamping plates to move to and from one another, and the screws 40 draw the ends of the clamping plates together so that the die plate 43 is very rigidly held in position in the carrier thus formed. A justifying plate 44 is detachably secured on the rear side of the carrier, and is provided on its right hand end with a lug 45, which is engaged by a justifying finger that is carried by the plunger, and which is hereinafter described. The right hand end of the plate 44 is also provided with a downwardly extending lug 46, through which passes a transversely arranged set screw 47.

The description so far covers the die and die carrier, together with the driving gear and mechanism for imparting reciprocatory motion to said die and die carrier.

Figure 10:
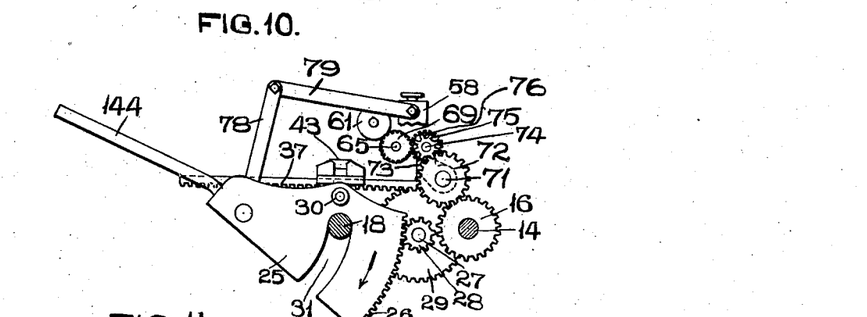
Fig. 10 is an elevation of a segment, and the gearing which operates the inking rollers.
Figure 11:
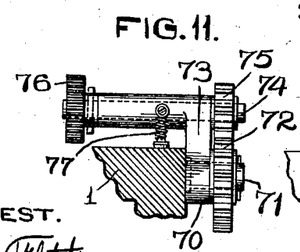
Fig. 11 is a detail end view of a device for shifting the position of the inking roller between its periods of engagement with the die.
Figure 12:
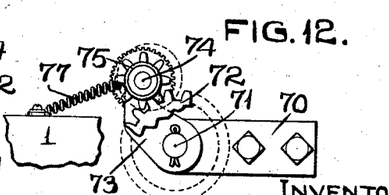
Fig. 12 is a side elevation of the device seen in Fig. 11, with a portion of one of the pinions broken away.
Figure 13:
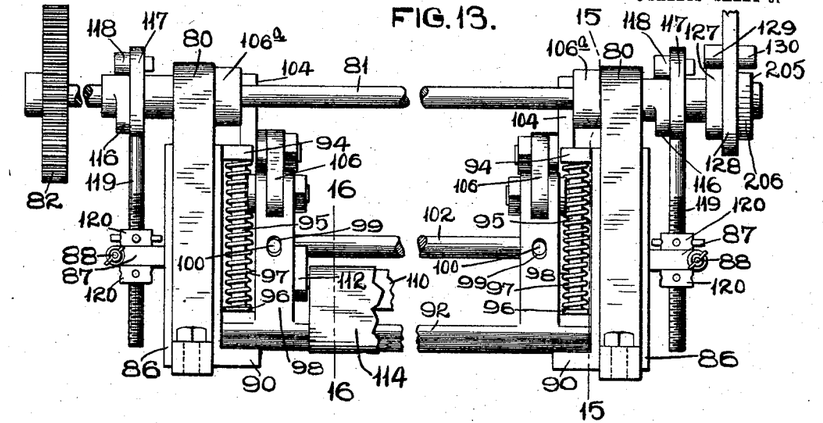
Fig. 13 is a rear view of the die wiping mechanism.

The operation of these various parts will now be described: The driving shaft 14 is rotated as the pulley 14ª is moved, and this rotary motion is transmitted by means of the pinion 17 to the gear wheel 19. The roller 30 on the segment 25 riding in the circular portion 23 of the cam groove, or slot, maintains the segment 25 in its elevated position, and no actuation thereof takes place until said roller travels into the straight portion of this cam groove, or slot. As said roller travels through the first half of this straight portion, said roller is borne upon so that the outer end of the segment 25 is moved downwardly, into the position seen in Fig. 10, and as the roller travels through the remaining part of the straight portion of the groove or slot, the segment is elevated, and, as a result, a reverse rotary motion is imparted to the pinion 28. Thus, the shaft 27 on which the pinion 28 is mounted and the gear wheel 29 are rotated first in one direction, and then reversed, and as the rack 37 meshes with the gear wheel 29, said rack and the die carrier will be moved rearwardly through the machine, and then returned to their original positions with the die carrier and die resting on top of the front frame 3. This actuation takes place during the time the counter die is elevated, and is for the purpose of providing ink for the die, and the subsequent wiping of the top surface thereof to remove the excess ink therefrom.

Figure 1:
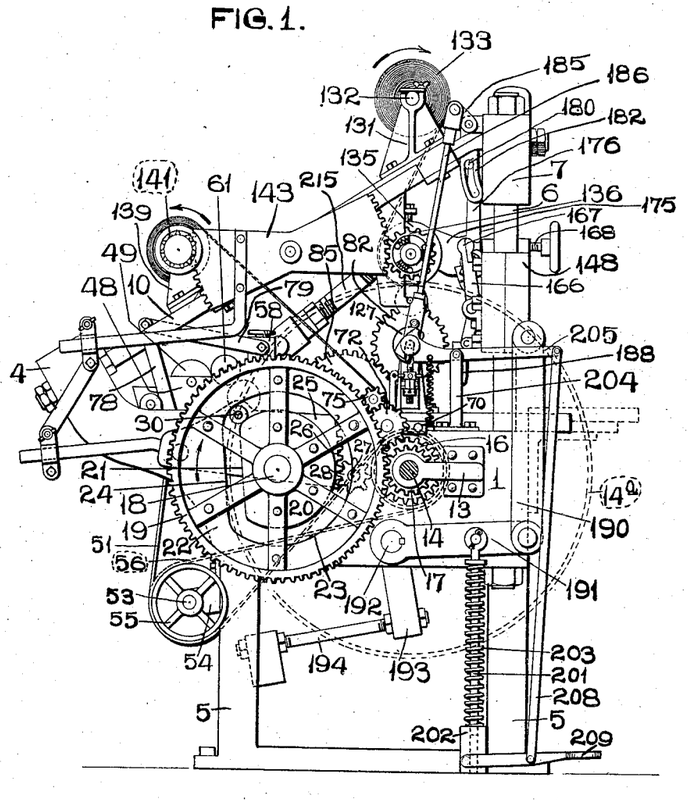
Figure 1 is an elevation of my improved machine looking at the right hand side thereof.
Figure 2:
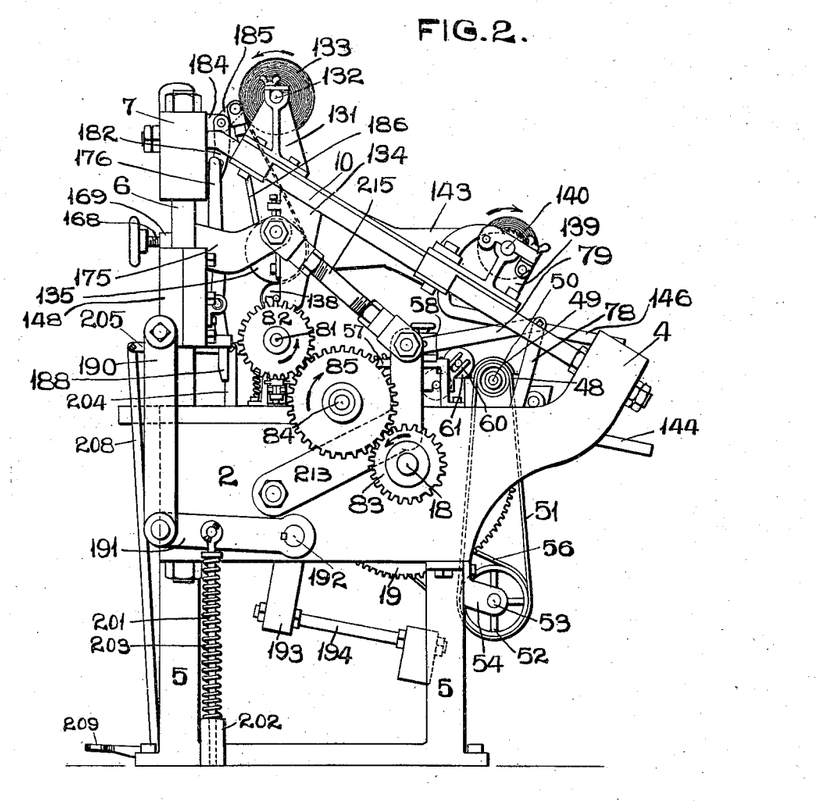
Fig. 2 is an elevation of the machine looking at the left hand side thereof.
Figure 14:
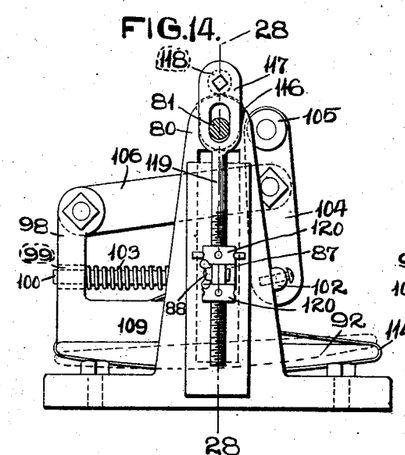
Fig. 14 is an elevation, partly in section, looking at the right hand end of the wiping mechanism seen in Fig. 13.
Figure 15:
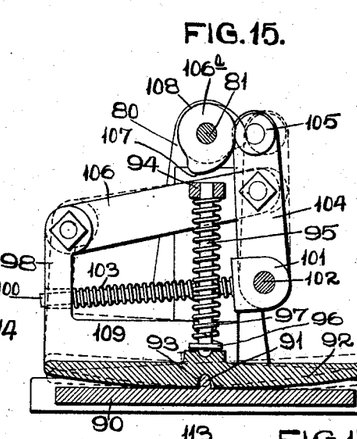
Fig. 15 is a vertical section taken approximately on the line 15—15 of Fig. 13.
Figures 16, 17:
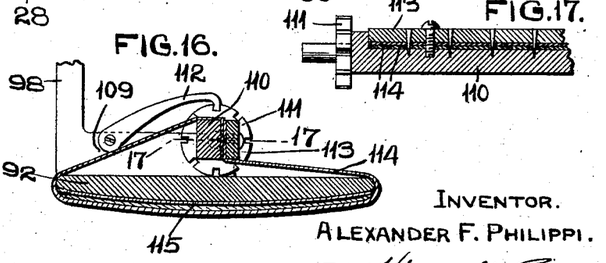
Fig. 16 is a detail section taken approximately on the vertical line 16—16 of Fig. 13.
Fig. 17 is a detail section taken approximately on the horizontal line 17—17 of Fig. 16.

The inking mechanism and its operation will now be described: Transversely located at the rear of the framework, with its ends resting on the rear ends of the side frames 1 and 2 is an ink fountain in the form of a trough 48, in which operates a roller 49; the ends of which are journaled in the ends of the trough 48. On one end of this roller, outside the trough 48, is fixed a pulley 50, over which passes a belt 51, which passes around and is driven by a pulley 52 carried by a shaft 53, which is journaled in brackets 54 arranged beneath the body of the frame. Fixed upon this shaft 53 is a second pulley 55, driven by a belt 56 which passes around a small pulley carried by the driving shaft 14, (see dotted lines in Fig. 1.) Fixed on the top edges of the side frames 1 and 2 immediately in front of the trough 48 are the horizontally arranged rails 57, on which the inking roll carrier reciprocates. This carrier comprises an inverted U-shaped frame 58, provided with ears 59, which ride upon the rails 57. Carried by one side of the frame 58 in suitable bearings 60 is a roller 61, which may be termed an intermediate roller, and which contacts with the roller 49 that operates in the trough 48. Vertically arranged in the ends of the frame 58 are rods 62, the lower ends of which are screw threaded, and enter bearing blocks 63. Located upon said rod 62, between the blocks 63, and the top of the frame 58 are expansive coil springs 64. Journaled in the blocks 63 is the shaft 65 of the inking roller 66, which applies the ink to the die, and which roller 66 is in peripheral engagement with the intermediate inking roller 61. Arranged for vertical adjustment upon the block 63 are the downwardly extending fingers 67, in the lower ends of which are journaled rollers 68, which ride upon the inclined top surfaces of the clamping plates 38 to carry the inking roller 66 over said plates, and so that it will only contact with the top surface of the die. For this reason, the peripheries of the rollers travel in a plane slightly below that in which the periphery of the inking roller 66 travels. Mounted on one end of the shaft 65 outside the frame 58 is a corrugated pinion 69. Bolted to the outside face of the side frame 1, immediately above the main shaft 14, is a bracket 70, in the forward end of which is journaled a short shaft 71, which carries on its outer end a pinion 72, which meshes with the pinion 16 carried by said main shaft. Pivotally mounted on the shaft 71 is an upwardly projecting bracket 73, in the upper end of which is journaled a shaft 74, and on the outer end thereof is mounted a pinion 75, which meshes with the pinion 72. Mounted upon the inner end of the shaft 74 is a corrugated wheel 76, which is in position to be engaged by the corrugated wheel 69 on the end of the inking roller shaft 65. This contact, or engagement, only takes place when the inking roller carriage is moved to its forward limit of movement. A retractile coil spring 77 is secured to a suitable point on the side frame 1, and at its opposite end to the upper end of the bracket 73, the normal tendency of which spring is to pull the upper end of the bracket 73 rearwardly, so as to cause the corrugated wheel 76 to mesh with the corrugated wheel 69. Fixed to and extending upwardly from the shaft which carries the segment 25 is an arm 78, to the upper end of which is pivotally secured the rear end of a link 79, which is pivotally secured at its forward end to the right hand side of the inking roller frame 58. When the segment 25 moves upwardly and downwardly, the arm 78 is swung backwardly and forwardly, and owing to the connection of the link 79, the inking roller carriage 58 reciprocates upon the rails 57. This reciprocation is in opposition to the reciprocation of the die carrying bed; that is, when the bed moves rearwardly, the ink roller carriage moves forwardly, and vice versa. When the inking roller carriage is at its rearward limit of movement, as seen in Figs. 1 and 2, the intermediate roller 61 is in peripheral contact with the fountain roller 49, and as said last mentioned roller is continuously rotating, ink is transferred by said intermediate roller to the inking roller 66. When the die carrying bed moves rearwardly, the ink roller carriage moves forwardly, and when these parts meet, the rollers 68 ride up the inclined face 42 of the rear one of the plates 38, and thus carry the inking roller 66 over the top surface of said plate 38, and into position where it will only engage the top surface of the die. (See Figs. 25 and 26.) The ink roller thus inks the top surface of the die, and is carried to the forward end of the stroke, while the die carrying bed travels to the rear end of its stroke. When the inking roller carriage reaches the forward end of its stroke, the corrugated wheels 69 and 76 mesh, and, as a result, the inking roller is partially rotated, and its surface is practically reinked from contact with the intermediate roller 61. The corrugated wheel 76 rotates continuously, being driven by the pinions 75, 72, and 16, which latter pinion is carried on the main shaft 14, which rotates continuously. As the die carrying bed returns to its forward position, and the inking roller carriage returns to its rearward position, the surface of the die is again inked, and the inking roller 66 is elevated over the die carrying carriage by the lifting motion of the rollers 68 traveling upon the inclined faces of the plates 38. Immediately after the die is inked the second time, and before it returns to its normal position on top of the front frame 3, it is engaged by a rocking wiping mechanism, to clean the surface of the die of all excess ink, and which wiping mechanism will now be described: (see Figs. 13 to 17, inclusive.) Bolted on top of each of the side frames 1 and 2 a short distance to the rear of the rods 6 are the vertically slotted standards 80, in the upper ends of which is journaled for rotation a transversely arranged shaft 81. Fixed upon the left hand end of this shaft 81 is a gear wheel 82. Fixed upon the left hand end of the shaft 18 is a gear wheel 83, which is of the same diameter as is the gear wheel 82. Arranged for rotation upon a stud 84, which projects from the left hand side frame 2 is an intermediate gear 85, which meshes with both the gear wheels 82 and 83, and thus imparts rotary motion from the shaft 18 to the shaft 81. Arranged to slide vertically in each slotted standard 80 is a box 86, and integral with the outer face of each box is an outwardly projecting lug 87, which is split vertically, and passing through the outer ends thereof is a set screw 88. Arranged in each box, and bearing against the bottom thereof is a vertically arranged expansive coil spring 89, the upper end of which bears against the portion of the standard at the upper end of the slot therein. Formed integral with and extending inwardly from the lower end of each box 86 is a narrow flange 90, in the center of which is formed an upwardly projecting lug, or tooth, 91. Transversely arranged between the lower portions of the boxes 86, with its ends resting upon the flanges 90 is a wiping plate 92, the under side of which is gradually curved upwardly in both directions from the center, toward its front and rear edges. Formed in the under side of this plate at its ends are recesses 93, in which the lugs or teeth 91 normally engage. Formed integral with and projecting outwardly from the inside faces of the boxes 86 at the tops thereof are lugs 94, through which pass the upper end of vertically arranged rods 95, the lower ends thereof bearing on the top sides of the plate 92, at the ends thereof. Formed upon these rods 95, adjacent the lower ends thereof are disks 96, and located upon said rods between these disks and the lugs 94 are expansive coil springs 97. These coil springs are for the purpose of yieldingly retaining the wiper plate 92 upon the flanges 90. Formed integral with the corners of the wiping plate 92 at the front edge thereof, which is the edge that extends toward the rear of the press, are the standards 98, through each of which is formed a horizontally arranged aperture 99. Passing through each aperture 99 is one end of a rod 100, the opposite end of which is provided with a head 101, through which passes a transversely arranged shaft 102, the ends of which are secured to the standards 80. Located on each rod 100 between the head 101 and the standard 98 is an expansive coil spring 103. Pivotally mounted on the shaft 102 adjacent each standard 80 is an upwardly extending arm 104, the upper end of which carries a roller 105. Pivotally secured to the upper end of each post 98 is one end of a link 106, the opposite end of which is pivotally connected to the corresponding one of the arms 104, immediately below the roller 105. Fixed upon the shaft 81 immediately inside each of the standards 80 is a cam 106ª, having a high portion 107, and a low portion 108. The coil springs 103 pressing upon the posts 98 tend to move the same outwardly, and, as a result, the rollers 105 are maintained in engagement with the surfaces of the cams 106ª. This action of the coil springs also maintains the front edge of the wiping plate 92 in a depressed position, as shown by dotted lines in Fig. 14, and while so positioned, the rollers 105 are upon the low portions 108 of the cams 106ª. Arranged for rotation in lugs 109 formed on the ends of the plate 92, is a transversely arranged bar 110, on one end of which is fixed a notched wheel 111. A pawl 112 is pivotally arranged on one of the lugs 109, and the point of which engages between the teeth of the notched wheel 111. A strap 113 is detachably secured to one side of the bar 110, and clamped between said strap and bar are the ends of a section of cloth 114, or analogous material, which passes around the under side of a wiping plate 92, for the purpose of retaining in position sections of felt 115, or analogous material, thus forming a yielding wiping surface on the under side of the wiping plate. The bar is arranged to rotate so that the section of cloth can be drawn tight, and so held by means of the notched wheel and pawl. Fixed on the shaft 81 just outside the standards 80 are the cams 116; and arranged for vertical movement upon said shaft adjacent each cam is a slotted head 117, each of which carries a roller 118, which rides directly on the surface of the adjacent cam 116. Formed integral with the head 117 is a downwardly projecting screw-threaded rod 119, which passes through the corresponding one of the lugs 87, and lock nuts 120 are positioned on each screw rod above and below each lug so as to adjustably hold each screw rod relative the corresponding lug 87 and box 86. These cams 116 and the devices actuated thereby are for the purpose of lifting the boxes 86, and consequently the wiping plate 92 at the time the die carrying bed passes rearwardly in the machine to be engaged by the inking rollers, and which vertical movement is opposed by the expansive coil springs 89. Fixed upon the shaft 81 at the right hand side thereof and outside the right hand cam 116 is a cam 127, adjacent which is arranged for vertical movement upon the shaft 81 a slotted plate 128, on which is mounted a roller 129 that rides upon the surface of the cam 127. On the opposite side of the slotted plate 128 from the roller 129 is a roller 130, which is engaged by a throw out lever hereinafter described.

Figure 3:
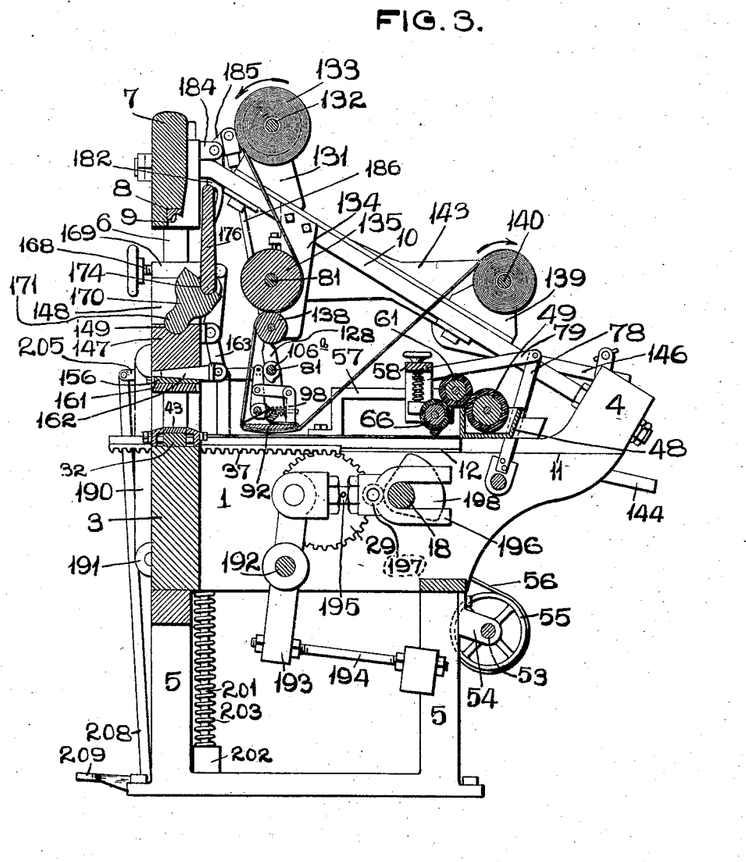
Fig. 3 is a vertical section taken through the center of my improved machine.
Figure 4:
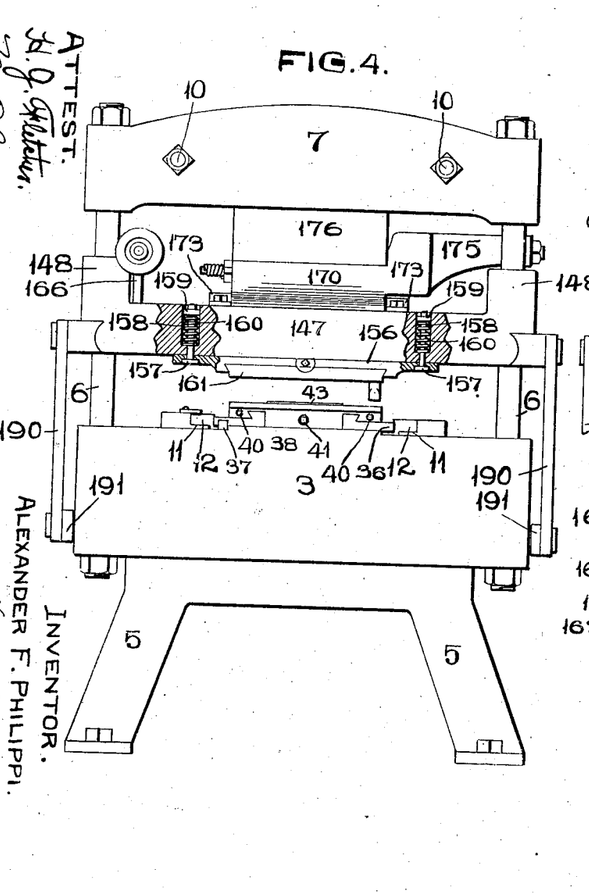
Fig. 4 is a front elevation of the machine with certain of the parts removed therefrom.
Figure 5:
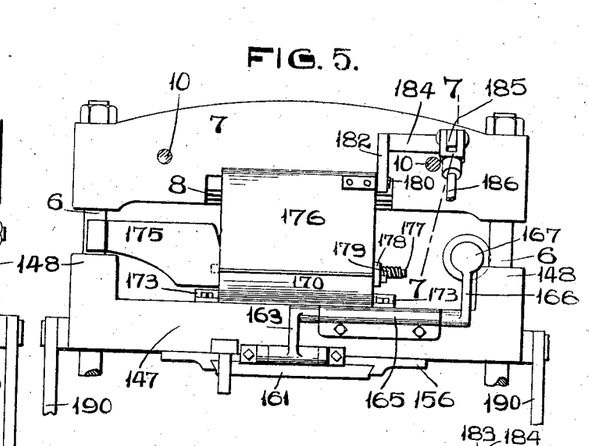
Fig. 5 is a rear elevation of the upper portion of the front end of the press.
Figures 6, 7, 8:
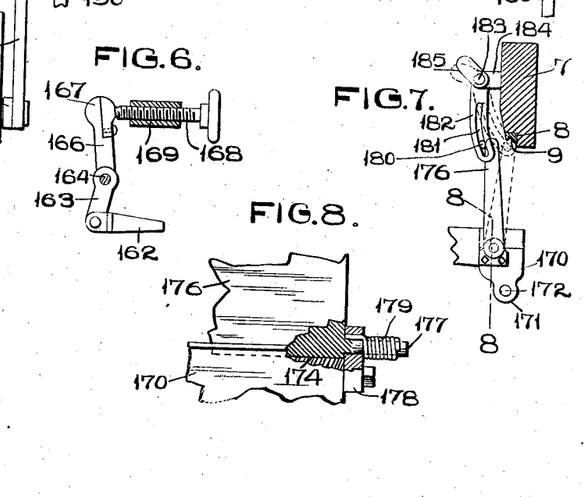
Fig. 6 is a detail elevation, partly in section, illustrating the device for adjusting the counter die that is carried by the plunger.
Fig. 7 is a detail vertical section taken approximately on the dotted line 7—7 of Fig. 5.
Fig. 8 is a detail vertical section taken approximately on the line 8—8 of Fig. 7.
Figure 9:
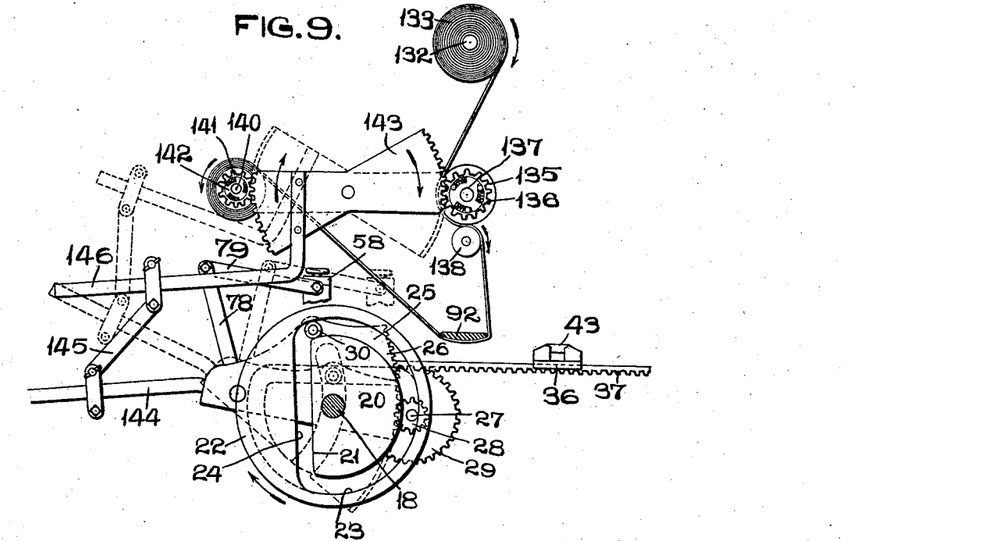
Fig. 9 is a detail elevation of the cam that actuates the die carrying bed, the inking roller carriage, and the mechanism which actuates the continuous wiping strip.

The arrangement of the continuous slip of paper that passes beneath the wiping plate, and the mechanism for intermittently feeding said paper will now be described, (see Figs. 3 and 9.) Positioned on the upper ends of the rods 10 immediately to the rear of the upper cross piece 7 are the brackets 131, in which is arranged for rotation the shaft 132, on which is wound the supply of paper 133 in the form of a continuous web, which is fed beneath the wiping plate for the purpose of receiving the excess ink from the surface of the die. Brackets 134 extend downwardly from each rod 10 beneath each bracket 131, and transversely arranged between said brackets and journaled therein is the shaft of a feed roller 135, on the right hand end of which is mounted a pinion 136, which is connected to its shaft by a suitable ratchet mechanism 137, which drives the shaft and roll in one direction, and allows said pinion to move loosely upon the shaft in the opposite direction, and without imparting a reverse motion to the feed roller 136. Transversely arranged between the brackets 134, immediately beneath the roller 135 is a friction roller 138. Brackets 139 are arranged on the lower portions of the rods 10, immediately in front of the extension 4, and arranged transversely between said brackets and journaled therein is a shaft 140, onto which the paper is wound after it comes from the wiping plate 92. Mounted on the right hand end of this shaft 140 is a pinion 141, which is provided with a suitable ratchet mechanism 142, which allows the pinion and shaft to move together in one direction, and which permits the pinion to move independently in a reverse direction without imparting motion to the shaft. A suitable friction disk is arranged in the ratchet mechanism 142, which disk is for the purpose of allowing the shaft 140 to rotate in a reverse direction when the web of paper is wound thereon, and which action takes place when the wiping plate lowers to its normal position after the paper has been shifted beneath said plate, and this results in a proper tension in said web of paper. Pivoted at its center to the right hand one of the rods 10 between the brackets 131 and 139 is a double segment 143, having gear teeth at each end which mesh with the pinions 136 and 141. Fixed to and extending rearwardly from the segment 25 is an arm 144, to which is adjustably secured the lower end of a connecting link 145, the upper end of which is adjustably secured to an arm 146, which is fixed to and projects rearwardly from the rear portion of the segment 143. This mechanism is for the purpose of rocking the double segment 143 to impart the necessary rotary motion to the feed roller 135, and winding shaft 140. The web of the paper 133 passes downwardly from the roll upon the shaft 132 around the rear side of the feed roller 135, between said feed roller and the friction roll 138, and from thence downwardly beneath the wiping plate 92, and from thence to and around the shaft 140, on which it winds.

The operation of the die wiping mechanism and the paper shifting mechanism is as follows: Rotary motion is imparted to the shaft 81 by the gearing 82, 83, and 85, which rotary motion is continuous and at the same speed for the reason that the gear wheels 82 and 83 are of the same diameter. At the time the die carrying bed passes beneath the wiping plate, the high points of the cams 116 engage the rollers 118 and lift the same together with the rods 119, boxes 86, the wiping plate, and all parts carried thereby. Thus, said wiping plate is elevated to allow the die carrying bed to pass rearwardly through the machine to be engaged by the inking roller. At the time the wiping plate is elevated, that portion of the web of the paper 133 that is beneath said plate is free and hangs loose, and at this period the paper is shifted so as to bring paper having a clean surface in the position beneath the wiping plate to be engaged thereby when said plate descends. The shifting of the paper is accomplished by the rocking of the segment 25 which necessarily elevates the outer end of the arm 144. Through the connecting link 145 the arm 146 is likewise swung upwardly, and the double segment 143 is shifted. The pinions 141 and 136 being in mesh with the ends of the segment 143 are necessarily partially rotated, and in so doing a corresponding amount of paper is unwound from the roll 133 by the rotation of the feed roller 135, and a corresponding amount of paper is shifted along beneath the wiping plate 92, and wound upon the shaft 140. The pinion 136 is slightly larger in diameter than is the pinion 141 in order to wind a slightly greater amount of paper upon the shaft 140 than is unwound by the feed roller 135, this action being for the purpose of maintaining the proper tension of the paper upon the wiping plate 92. When the segment 143 returns to its normal position by the actuation of the segment 25 and connections, the pinions 136 and 141 will, by reason of the ratchet devices, travel loosely upon the shafts on which they are mounted without actuation of the feed roller 135 and the winding shaft 140. Thus the paper is fed along intermittently, and a fresh surface is brought into position beneath the wiping plate just prior to the time when said plate performs the wiping operation on the surface of the die, and the soiled paper is wound upon the shaft 140. When the top surface of the die engages against the paper on the under side of the plate 92, the rollers 105 are riding upon the low portions 108 of the cams 106$^a$, and said plate 92 is in the position seen by dotted lines in Fig. 14 with its front edge depressed. The die travels along beneath the wiping plate, and in doing so said plate yieldingly rides over the face of said die, owing to the arrangement of the coil springs 97. Simultaneous with the passage of the die beneath the plate, the high portions 107 of the cams 106$^a$ engage the rollers 105, and move the same rearwardly, and, as a result, the arms 104 are slightly shifted, which pulls the links 106 rearwardly, thus tending to pull the upper ends of the posts 98 rearwardly, and, as the ends of the plate 92 are held by the engagement of the lugs 91 in the recesses 93, the plate will be rocked, as shown by dotted lines in Fig. 15, so that the entire portion of the paper beneath the wiping plate 92 is brought into contact with the face of the forwardly moving die. Owing to the curvature of the under side of the plate 92, the rocking motion thereof, and the forward movement of the die, a continuously shifting transverse line of clean paper is being forced into contact with the surface of the moving die, with a yielding wiping motion which very effectually removes all the ink from the surface of the die, and leaves the proper quantity of ink in the recesses cut in the die. The die carrying bed now travels to its position on top of the front frame 3, the soiled paper shifts from beneath the die wiping plate, and after a sheet of paper that is to be printed and embossed is positioned on top of the die, the plunger carrying the counter-die descends, and pressure is applied to the counter-die to properly print and emboss the inserted sheet.

Figures 19, 20:
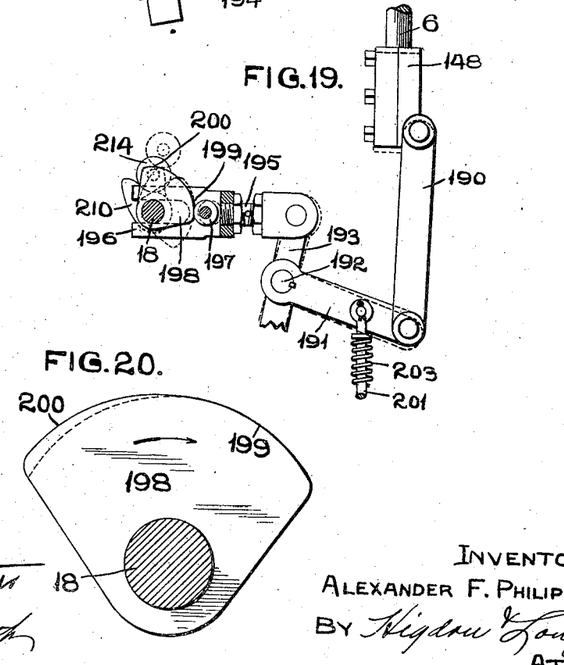
Fig. 19 is a view of the mechanism illustrated in Fig. 18, but shown in a different position.
Fig. 20 is an enlarged elevation of the cam that actuates the plunger moving mechanism.

The vertically operating plunger carrying the adjustable counter die and the compound toggle mechanism for applying pressure to the counter die will now be described: The plunger 147 comprises a transversely arranged bar, provided on its ends with vertically arranged blocks 148, which slide upon the rods 6, between the front cross frame 3 and the upper cross piece 7. Formed in the top side of the plunger is a transversely extending groove 149. Arranged on the under side of the plunger is a plate 156, the top surface of which is slightly beveled, and the adjacent under side of the plunger is slightly beveled in an opposite direction, so that a wedge shaped space is formed between said plate and plunger. Passing upwardly through the ends of the plate 156 are bolts 157, which extend into recesses 158 formed in the plunger, and nuts 159 are located on the upper ends of these bolts. Expansive coil springs 160 are located in the recesses 158 upon the bolts, and beneath the nuts 159. Detachably held in any suitable manner to the under side of the plate 156 is the counter die 161. Arranged to slide in the wedge shaped space between the plate 156 and the under side of the plunger is a wedge plate 162, which is pivotally connected on its rear side to the lower end of an arm 163, the upper end of which is rigidly fixed on one end of a shaft 164 mounted to rock in a bearing 165 on the rear side of the plunger. The opposite end of this shaft 164 is provided with an upwardly projecting arm 166 having a ball and socket connection 167 at its upper end with a screw rod 168 that passes through a bracket 169 carried by one of the blocks 148. The manipulation of this screw rod 168 rocks the shaft 164, consequently moving the wedge plate 162 inwardly or outwardly, which results in vertical adjustment of the plate 156 and counter die 161. A transversely arranged toggle link 170 is provided on its lower end with a circular bearing 171, which operates in the transverse groove 149 in the top of the plunger, and trunnions 172 formed on the ends of said link engage beneath bearing boxes 173 positioned on top of the plunger at the ends of the groove in the top thereof. Formed in the top of this link is a longitudinally extending groove 174, and formed on or fixed to the left hand end of the link 170 is an arm 175. Arranged for operation in the groove 174 is the lower end of a second toggle link 176, in the form of a plate, the upper end of which is rounded and adapted to engage in the bearing 9 formed in the under side of the transverse bar 8. Extending outwardly from the right hand end of the link 176, and at the lower end thereof is a pin 177, which projects through a plate 178 bolted to the right hand upper corner of the link 170, and wound upon said pin is a coil spring 179, one end of which is fixed to said pin, and the opposite end of which engages in the plate 178. The normal tendency of this spring is to move the upper end of the link 176 forwardly, and into the bearing 9. Arranged at the upper right hand corner of the rear face of the link 176 is an outwardly projecting pin 180, which projects through and operates in a slot 181 formed in an arm 182 that is fixed to and depends from a shaft 183, held for rotation in a bearing 184 which is fixed to the rear side of the upper cross piece 7. Fixed on the opposite end of this shaft 183 is a short crank 185, and pivotally connected to the upper end of this crank is the upper end of a rod 186, which extends downwardly on the right hand side of the machine, and which is rigidly secured to the upper end of the plate 128, previously described. 187 designates a lug formed on the rear side of the plunger 147, in which lug is seated the upper end of a pin 188, provided on one side of its lower end with an inclined face 189, which is adapted to engage against the face of the lug 45, to justify and lock the die carrying bed in position upon the front cross frame 3. Pivotally connected to each end of the plunger 147 are the upper ends of a pair of links 190, the lower ends of which are pivotally connected to the forward ends of a pair of horizontally arranged links 191 that are positioned against the outer faces of the side frames 1 and 2. The rear ends of these links 191 are rigidly mounted on the ends of a shaft 192, which is transversely arranged and mounted for rotation in the side frames 1 and 2 below the main shaft 13. Fixed upon the shaft 192 between the side frames is a vertically extending bar 193, and projecting rearwardly from the lower end thereof is a weighted rod 194. To the upper end of the bar 193 is pivotally secured the forward end of a rod 195, the rear end of which is provided with a block 196, which is bifurcated both vertically and horizontally, and which is arranged to slide upon the counter shaft 18. Arranged for rotation in the forward portion of the vertical slot through this block 196 is a roller 197. Keyed upon the shaft 18 in the vertical slot in the block 196 is a cam 198, having a low portion 199 and a high portion 200, which low portion is concentric with the center of the shaft 18, and which high portion gradually increases from the concentric portion of said cam. (See Fig. 20.) The face of this cam 198 rides upon the periphery of the roller 197, and said roller is held in this engagement by the action of the weighted arm 194. Pivotally connected to the link 191 on the right hand side of the press is the upper end of a vertically arranged rod 201, which extends downwardly into a bearing 202, at the base of the press. A washer is fixed on the upper end of the rod 201, and an expansive coil spring 203 bears against this washer, and on top of the bearing 202. Fixed to the right hand side frame 1, adjacent the standard 80 thereon, is a bracket 204, to which is fulcrumed a horizontally arranged lever 205, the forward end of which is slotted and engages over the right hand end of the shaft 81, and the end of said lever 205 is inclined, as indicated by 206, and is adapted to engage against the under side of a roller 130 that is carried by the outside of the plate 128 directly opposite the roller 129. To the forward end of the lever 205 is pivotally connected the upper end of a downwardly pending rod 208, the lower end of which is pivotally connected to a foot lever 209 which is fulcrumed to the bearing block 202. Fixed upon the shaft 18 immediately against the side frame 2 and inside the gear wheel 83 is a cam 210, having a high portion 211, and a low portion 212. Pivotally secured at its lower end to the face of the side frame 2 is a bell crank 213 that extends over the shaft 18, where it is provided with a roller 214 that rides on the periphery of the cam 210. Pivotally secured to the upper end of the bell crank 213 is the lower end of an adjustable rod 215, the upper end of which is pivotally secured to the outer end of the arm 175 carried by the lower toggle link 170.

Figure 18:
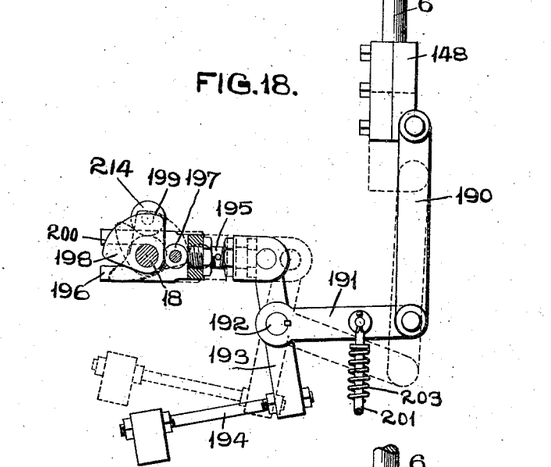
Fig. 18 is a detail elevation, partly in section, showing the cam and lever mechanism that actuates and controls the vertical movement of the plunger.
Figure 21:
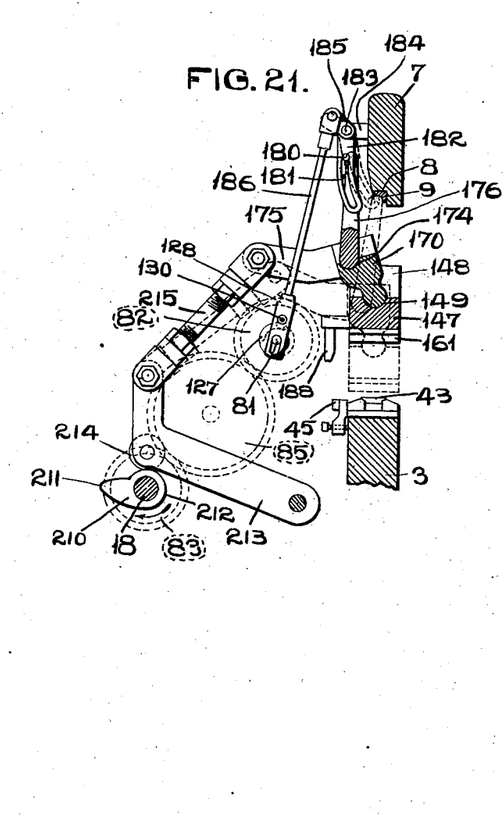
Fig. 21 is a vertical section taken through the central portion of the upper part of the press, and illustrating the compound toggle mechanism and cam for operating the same, by means of which pressure is applied to the counter die.
Figure 22:
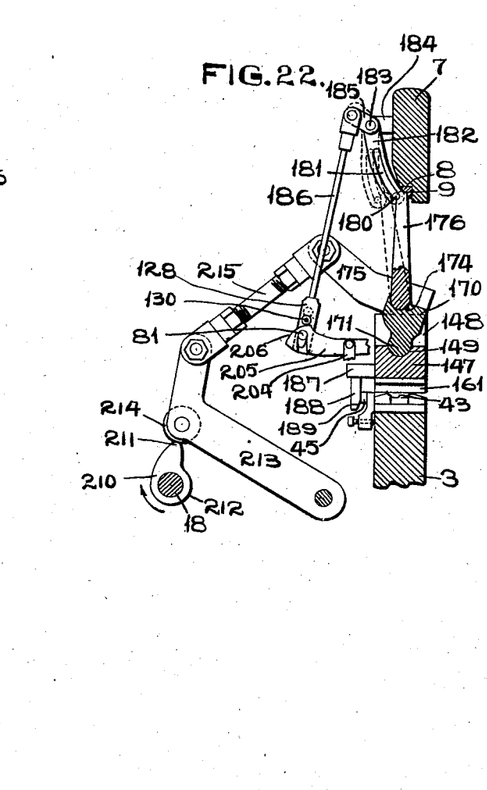
Fig. 22 is a view analogous to Fig. 21, and showing the compound toggle mechanism in the position it assumes when the maximum pressure is being applied to the counter die.
Figures 23, 24, 25, 28:
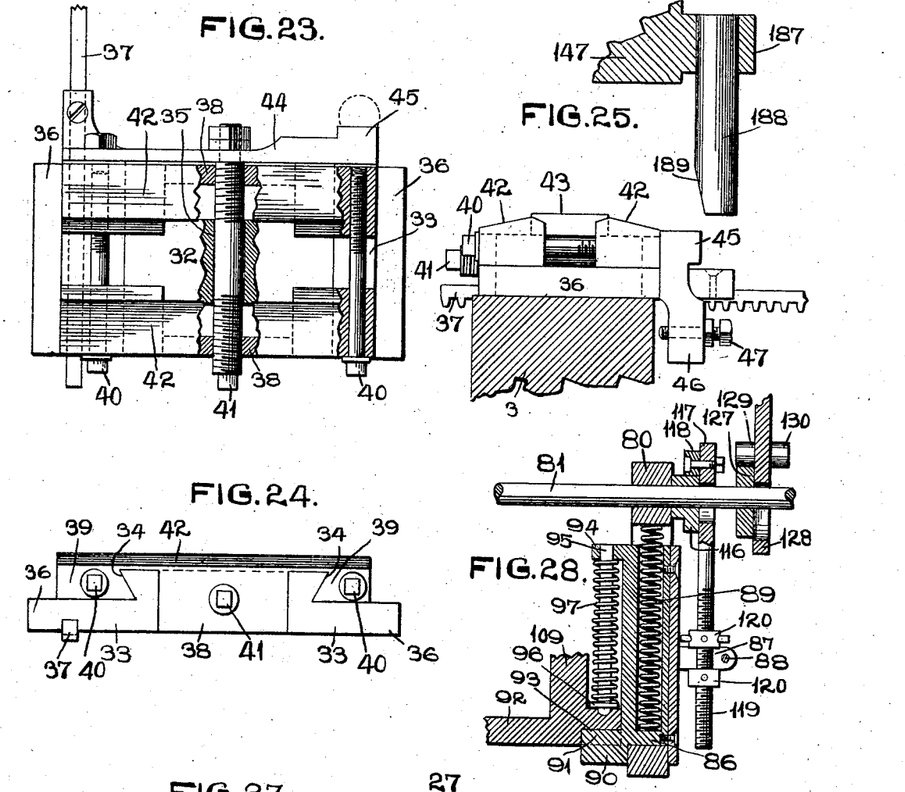
Fig. 23 is a plan view of the die carrying bed, parts thereof being broken away, more clearly illustrating the same.
Fig. 24 is a front elevation of the die carrying bed.
Fig. 25 is an end elevation of the die carrying bed, and means whereby the position of the same is justified, and locked when engaged by the plunger carrying the counter die.
Fig. 28 is a vertical section taken on the line 28—28 of Fig. 14.
Figure 26:
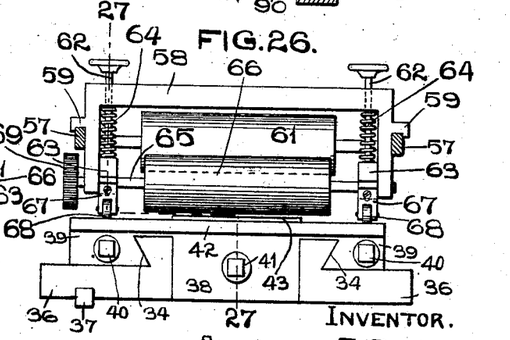
Fig. 26 is a front view of the printing die with the inking rollers in the position they assume just prior to their contact with the surface of the die.
Figure 27:
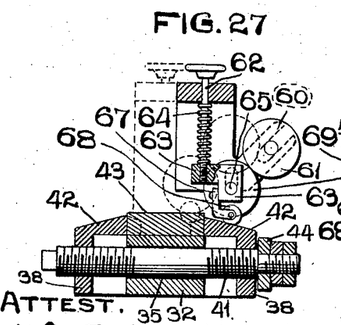
Fig. 27 is a vertical section taken approximately on the line 27—27 of Fig. 26.

The operation of the plunger together with the operation of the compound toggle mechanism, by means of which the impression is obtained, will now be described: The counter shaft 18 in rotating carries the cam 198 around until one shoulder or face thereof engages against the roller 197, (see Fig. 18,) and the shoulder bearing against said roller moves the bifurcated block 196, rod 195, and the upper end of the bar 193, forwardly. This motion necessarily rocks the shaft 192 and swings the lower end of the bar 193 rearwardly, and thus elevates the weighted arm 194. The shaft 192 being rocked, moves the outer ends of the links 191 downwardly, and in so doing draws the links 190 and the plunger downwardly. The upper end of the toggle link 176 following downwardly with the toggle link 170 and plunger is carried down to a position adjacent the bearing 9 formed in the under side of the plate 8, and when this point is reached, the power stored in the coil spring 179 will throw the rounded upper end of said toggle link into said bearing 9. At this time, the pin 180 is at the lower end of the slot 181 in the arm 182, and the toggle links and the plunger are in the position seen by dotted lines in Fig. 21. This operation brings the counter die to a point within a very slight distance from the top of the die 43, and the bearing between the link 176 and 170 is a slight distance to the rear of a vertical line drawn through the bearing 9, and the bearing between the under side of the link 170 and the plunger. The inclined face 189 of the pin 188 is now bearing upon the lug 45 to justify or correctly position the die carrying bed upon the front cross frame 3. The roller 197 is now riding upon the concentric face 199 of the cam 198, and at this point, the high portion 211 of the cam 210 engages the roller 214, and moves the same together with the bell crank 213, and rod 215, upwardly. The upper end of the rod 215 has necessarily been carried toward the front of the machine by the action of the toggle links, which previously descended with the plunger, as described, and as the high point 211 of said cam 210 rides upon the periphery of the roller 214, the toggle links are moved so that their bearings are in direct vertical alinement, as seen in Fig. 21, and thus the final high pressure is applied to the counter die to properly print and emboss the inserted sheet. During this final high pressure, the roller 197 has been lifted off the concentric portion 199 of the cam 198, and immediately after the application of the high pressure, the roller travels onto the higher portion 200 of said cam 198. Immediately after the high point of the cam 210 passes the roller 214, the toggle links will start to release or swing in reverse direction out of vertical alinement, but the plunger is held from ascending owing to the fact that the roller 197 is traveling around the higher portion 200 of the cam 198. Thus, said high portion of the cam acts as a relief following the high pressure applied to the die, and prevents any sudden jar or pounding following the release of the toggle links and various connections. As soon as the cam 198 travels around so that the high portion thereof disengages from the roller 197, said roller will travel down to the lower portion of said cam, and following this action the weighted arm 194, together with the pressure that was stored in the coil spring 203 will return the plunger and various connections to their normal positions.

The throw off mechanism for releasing the plunger so that there will be no impression on the inserted sheet, or to provide for the continuous inking of the die, is as follows: The foot lever 209 being engaged and moved downwardly will correspondingly move the rod 208 downwardly, and shift the lever 205 upon its fulcrum. The forward inclined end 206 of said lever engages against the roller 130 carried by the plate 208, and elevates these parts, together with the rod 186. This results in an actuation of the rock shaft 183, and moves the lower end of the slotted arm 182 outwardly so as to maintain the upper end of the link 176 out of engagement with the bearing 9. As long as the foot lever is engaged to hold the various parts in the positions just described, the plunger will reciprocate vertically, and the pin 180 carried by the link 176 will travel upwardly and downwardly through the slot 181; and, as a result, there will be no impression of the die carried by the plunger.

The operation herein described successively takes place as long as the belt drives the pulley 14ª, and said operations take place very rapidly, and therefore the sheets of paper or stationery to be printed and embossed can be very rapidly turned out.

The machine is very compact, requires but a minimum amount of power for operation, operates very smoothly, and produces a neat, clean, and well defined impression on the stationery when the counter die is properly adjusted.

The various operating parts of the press are readily accessible for the purpose of repair or adjustment, and by the arrangement of the toggle links and mechanism that operates the same, the high pressure is only applied to the counter die the instant that it is in engagement with the printing die.

I claim:

1. In an embossing press, a frame, a printing die arranged therein, a plunger operating in the frame above the printing die, means whereby said plunger is actuated, a bearing arranged in the frame above the plunger, toggle links connected to the plunger and arranged to apply pressure thereto, the upper end of one of which toggle links engages in the bearing, and means whereby the upper end of the link is moved into and out of the bearing; substantially as specified.

2. In an embossing press, a frame, a printing die arranged therein, a plunger operating in the frame above the printing die, a counter die carried by the plunger, means whereby the plunger is actuated, a bearing arranged in the frame above the plunger, and toggle links connected to the plunger and arranged to apply pressure thereto, and means whereby the upper end of the upper link is moved into and out of the bearing; substantially as specified.

3. In an embossing press, a frame, a printing die arranged therein, a plunger operating in the frame above the printing die, a bearing formed in the frame above the plunger, toggle links connected to the plunger and adapted to apply a pressure thereto, and means whereby the upper end of the upper link is moved into and out of the bearing; substantially as specified.

4. In an embossing press, a frame, a printing die arranged therein, a plunger operating in the frame above the printing die, a counter die carried by said plunger, a bearing formed in the frame above the plunger, toggle links for imparting a final vertical movement to the plunger, means whereby the upper end of the upper link is moved into the bearing, and means whereby the upper end of the upper link is held out of the bearing so that no action of the toggle links takes place; substantially as specified.

5. In an embossing press, a frame, a printing die arranged therein, a plunger operating in the frame above the printing die, a counter die carried by the plunger, toggle links connected to the plunger, a bearing formed in the frame and adapted to receive the upper end of the upper toggle link, means whereby the upper end of the upper link is moved into and out of said bearing, means whereby the plunger is moved into juxtaposition with the printing die, and separate means whereby the toggle links are moved to their limit of movement to force the counter die into contact with the printing die; substantially as described.

6. In an embossing press, a frame, a printing die arranged therein, a plunger operating in the frame above the printing die, a counter die carried by the plunger, toggle links connected to the plunger, a bearing formed in the frame and adapted to receive the upper end of the upper toggle link, means whereby the upper end of the upper link is moved into and out of said bearing, means whereby the counter die is moved into juxtaposition with the printing die, separate means whereby the toggle links are moved to their limit of movement to force the counter die into contact with the printing die, and means actuated by gravity for reversing the motion of the links and returning them, together with the plunger, to their normal positions; substantially as described.

7. In an embossing press, a frame, a printing die arranged for reciprocation therein, a counter die arranged to engage the printing die at one end of the stroke thereof, means whereby the printing die is inked prior to the time it is engaged by the counter die, a pair of standards arranged in the frame between which the printing die passes, flanges integral with the lower ends of each of the standards, and a spring pressed wiping plate having its ends arranged to rock upon said flanges; substantially as described.

8. In an embossing press, a frame, a printing die arranged for reciprocation therein, a counter die arranged to engage the printing die at one end of the stroke thereof, means whereby the printing die is inked prior to the time it is engaged by the counter die, a pair of standards arranged in the frame between which the printing die passes, flanges integral with the lower ends of each of the standards, a spring pressed wiping plate having its ends arranged to rock upon said flanges, and means whereby said wiping plate is rocked upon the flanges at the time the printing die passes between the standards and beneath said wiping plate; substantially as described.

9. In an embossing press, a frame, a printing die arranged for reciprocation therein, a counter die arranged to engage the printing die at one end of the stroke thereof, means whereby the printing die is inked prior to the time it is engaged by the counter die, a pair of standards arranged in the frame between which the printing die passes, flanges integral with the lower ends of each of the standards, a lug integral with the top face of each flange, and a spring pressed wiping plate with its ends arranged to rock on said flanges, and there being recesses formed in the under side of said wiping plate to receive the lugs; substantially as described.

10. In an embossing press, a frame, a printing die arranged for reciprocation therein, a counter die arranged to engage the printing die at one end of the stroke thereof, means whereby the printing die is inked prior to the time it is engaged by the counter die, a pair of standards arranged in the frame between which the printing die passes, flanges integral with the lower ends of each of the standards, a lug integral with the top face of each flange, a spring pressed wiping plate with its ends arranged to rock on said flange, there being recesses formed in the under side of said wiping plate to receive the lugs, and means whereby said wiping plate is rocked at the time the printing die passes beneath said wiping plate; substantially as described.

11. In an embossing press, a frame, a printing die arranged for reciprocation therein, a counter die arranged to engage the printing die at one end of the stroke thereof, means whereby the printing die is inked prior to the time it is engaged by the counter die, a pair of standards arranged in the frame between which the printing die passes, flanges integral with the lower ends of each of the standards, a lug integral with the top face of each flange, a spring pressed wiping plate with its ends arranged to rock on said flange, there being recesses formed in the under side of said wiping plate to receive the lugs, means whereby said wiping plate is rocked at the time the printing die passes beneath said wiping plate, and a flexible pad detachably and adjustably arranged on the under side of the wiping plate; substantially as described.

12. In an embossing press, a frame, a printing die carrying frame arranged for reciprocation therein, a lug formed integral with the rear side of said frame, a plunger operating in the frame at one end of the path of travel of the reciprocating frame, a counter die carried by the plunger, and a pin depending from the counter die and having an inclined face on its lower end which is adapted to engage against the lug on the reciprocating frame; substantially as described.

13. In an embossing press, a frame, a printing die frame arranged for reciprocation therein, means whereby said frame is reciprocated, a justifying plate fixed to the rear side of said frame, a lug formed integral with said plate, a plunger operating in the frame at one end of the path of travel of the reciprocating frame, a counter die carried by said plunger, and a pin depending from the counter die, the lower end of which pin engages with the lug on the justifying plate when the counter die engages the printing die; substantially as described.

14. In an embossing press, a frame, a printing die carrying frame arranged for reciprocation therein, which frame comprises a block, longitudinally extending arms on the sides of said block, there being shoulders formed on said arms, clamping blocks located on said arms and provided with ribs which engage the shoulders, a draw bolt passing through the center of the block and engaging the centers of the clamping blocks, and clamping screws passing through the ends of the clamping blocks and clamping screws; substantially as described.

15. In an embossing press, a frame, a printing die arranged for reciprocation therein, a counter die arranged to engage the printing die at one end of the stroke thereof, an inking roller frame arranged to pass over the face of the printing die during its travel to and from the point where it is engaged by the counter die, a spring pressed inking roller carried by the frame, rods vertically disposed at the ends of said frame, blocks carried by the lower ends of said rods through which blocks pass the inking roller shaft, fingers adjustably carried by said blocks and rollers journaled to the under sides of the said fingers and adapted to ride over the ends of the printing die carrying frame to elevate the inking roller; substantially as described.

In testimony whereof, I have signed my name to this specification, in presence of two subscribing witnesses.

ALEXANDER F. PHILIPPI.

Witnesses:
M. P. SMITH,
JOHN C. HIGDON.